United States Patent

Watanabe

[11] Patent Number: 5,999,809
[45] Date of Patent: *Dec. 7, 1999

[54] WIRELESS COMMUNICATION APPARATUS WITH DISTINCT ALARM SIGNALS

[75] Inventor: Mitsuhiro Watanabe, Ebina, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/559,285

[22] Filed: Nov. 15, 1995

[30] Foreign Application Priority Data

Nov. 18, 1994 [JP] Japan .................................. 6-285401

[51] Int. Cl.⁶ .................................................. H04Q 7/20
[52] U.S. Cl. .......................................... 455/421; 455/462
[58] Field of Search .................................. 379/58, 59, 61, 379/63; 455/33.1, 33.2, 33.4, 421, 462, 67.1

[56] References Cited

U.S. PATENT DOCUMENTS

| | | | |
|---|---|---|---|
| 4,443,661 | 4/1984 | Kabo | 455/33.4 |
| 4,658,416 | 4/1987 | Tanaka | 379/59 |
| 4,853,951 | 8/1989 | Bauer | 455/421 |
| 4,930,149 | 5/1990 | Matsushima | 455/421 |
| 4,974,251 | 11/1990 | Ohata et al. | 455/462 |
| 4,996,715 | 2/1991 | Marui | 379/63 |
| 5,297,203 | 3/1994 | Rose | 455/421 |

(List continued on next page.)

FOREIGN PATENT DOCUMENTS

| | | |
|---|---|---|
| 0305108 | 8/1988 | European Pat. Off. . |
| 0310379 | 9/1988 | European Pat. Off. . |
| 54-075201 | 6/1979 | Japan . |
| 54-124602 | 9/1979 | Japan . |

OTHER PUBLICATIONS

Patent Abstracts Of Japan, vol. 17, No. 665 (E–1472), Dec. 8, 1993, Patent Publication Number JP–A–05 219 154, Aug. 27, 1993.
Patent Abstracts Of Japan, vol. 17, No. 050 (E–1314), Jan. 29, 1993, Patent Publication Number JP–A–04 264 855, Sep. 21, 1992.
Patent Abstracts Of Japan, vol. 03, No. 096 (E–130), Aug. 1979, Patent Publication Number JP–A–54 075 201, Jun. 15, 1979 (cited above).
Patent Abstracts Of Japan, vol. 14, No. 457 (E–0986), Oct. 2, 1990, Patent Publication Number JP–A–02 184 149, Jul. 18, 1990.
Patent Abstracts Of Japan, vol. 03, No. 145 (E–155), Nov. 30, 1979, Patent Publication Number JP–A–54 124 602, Sep. 27, 1979 (cited above).
Patent Abstracts Of Japan, vol. 12, No. 244 (E–631), Jul. 9, 1988, Patent Publication Number JP–A–63 031 232, Feb. 9, 1988.
Patent Abstracts Of Japan, vol. 17, No. 337 (E–1388), Jun. 25, 1993, Patent Publication Number JP–A05 041 730, Feb. 19, 1993.
Tsutsui, et al. U.S. Patent Application Serial No. 08/147,400, filed Nov. 3, 1993.

Primary Examiner—Dwayne D. Bost
Assistant Examiner—Myron K. Wyche
Attorney, Agent, or Firm—Morgan & Finnegan, LLP

[57] ABSTRACT

A wireless communication apparatus having a first communication device (portable) and a second communication device (stationary) for mutually performing wireless communication. Reception of a wireless communication signal from the first communication device is detected by the second communication device. If no wireless communication signal has been received, the second communication device transmits an alarm signal to the first communication device, and if this state where no wireless communication signal is detected continues for a predetermined period, the second communication device transmits an alarm signal different from the initial alarm signal to the first communication device. Thereafter, the second communication device stops transmission of wireless communication signal to the first communication device.

65 Claims, 6 Drawing Sheets

U.S. PATENT DOCUMENTS

| | | | |
|---|---|---|---|
| 5,373,548 | 12/1994 | McCarthy | 379/61 |
| 5,425,076 | 6/1995 | Knippelmier | 379/58 |
| 5,426,690 | 6/1995 | Hikuma | 455/462 |
| 5,451,839 | 9/1995 | Rappaport | 379/59 |
| 5,490,286 | 2/1996 | Kah, Jr. | 455/421 |
| 5,490,288 | 2/1996 | Wiatrowski | 379/59 |
| 5,581,599 | 12/1996 | Tsuji | 455/462 |

WIRELESS COMMUNICATION APPARATUS WITH DISTINCT ALARM SIGNALS

BACKGROUND OF THE INVENTION

This invention relates to a wireless communication apparatus such as a cordless telephone, capable of communication by wireless communication means.

Conventionally, carrier sensing in cordless telephones is performed independently by a main phone and a subphone. That is, the main phone monitors a carrier signal in radio waves emitted from the subphone, and if it becomes that the carrier signal cannot be detected for a predetermined period, the main phone stops transmission of radio waves. The subphone also detects a carrier signal in radio waves emitted from the main phone, and if it becomes that the carrier signal cannot be detected, the subphone displays an alarm message at predetermined intervals. When the carrier has not been detected for a predetermined period, the subphone stops transmission of radio waves.

Accordingly, in the above conventional cordless telephone, in a case where output power of radio waves emitted by the subphone becomes low due to, e.g., depletion of a built-in battery, the main phone cannot detect the carrier signal not necessary from the subphone, though the subphone may detect the carrier signal from the main phone. In this case, there is a problem that the main phone may stop transmission of radio waves while any alarm message indicating that no carrier has been detected at the subphone is displayed.

SUMMARY OF THE INVENTION

An object of the present invention is to solve the above problem and provide a wireless communication apparatus which gives an alarm when a subphone cannot detect a carrier signal for a predetermined period, thus avoids abrupt stoppage of radio-wave transmission by a main phone.

The above object is attained by providing a wireless communication apparatus having a first communication device and a second communication device for mutually performing wireless communication wherein the second communication device comprising:

- detection means for detecting reception of a wireless signal from the first communication device;
- transmission means for transmitting a first alarm signal to the first communication device, if the detection means has not detected reception of the wireless signal; and
- halt means for halting transmission of a wireless signal to the first communication device, after transmission of the first alarm signal by the transmission means.

Other features and advantages of the present invention will be apparent from the following description taken in conjunction with the accompanying drawings, in which like reference characters designate the same name or similar parts throughout the figures thereon.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

Preferred embodiment of the present invention will now described in detail in accordance with the accompanying drawings.

Figure 1:
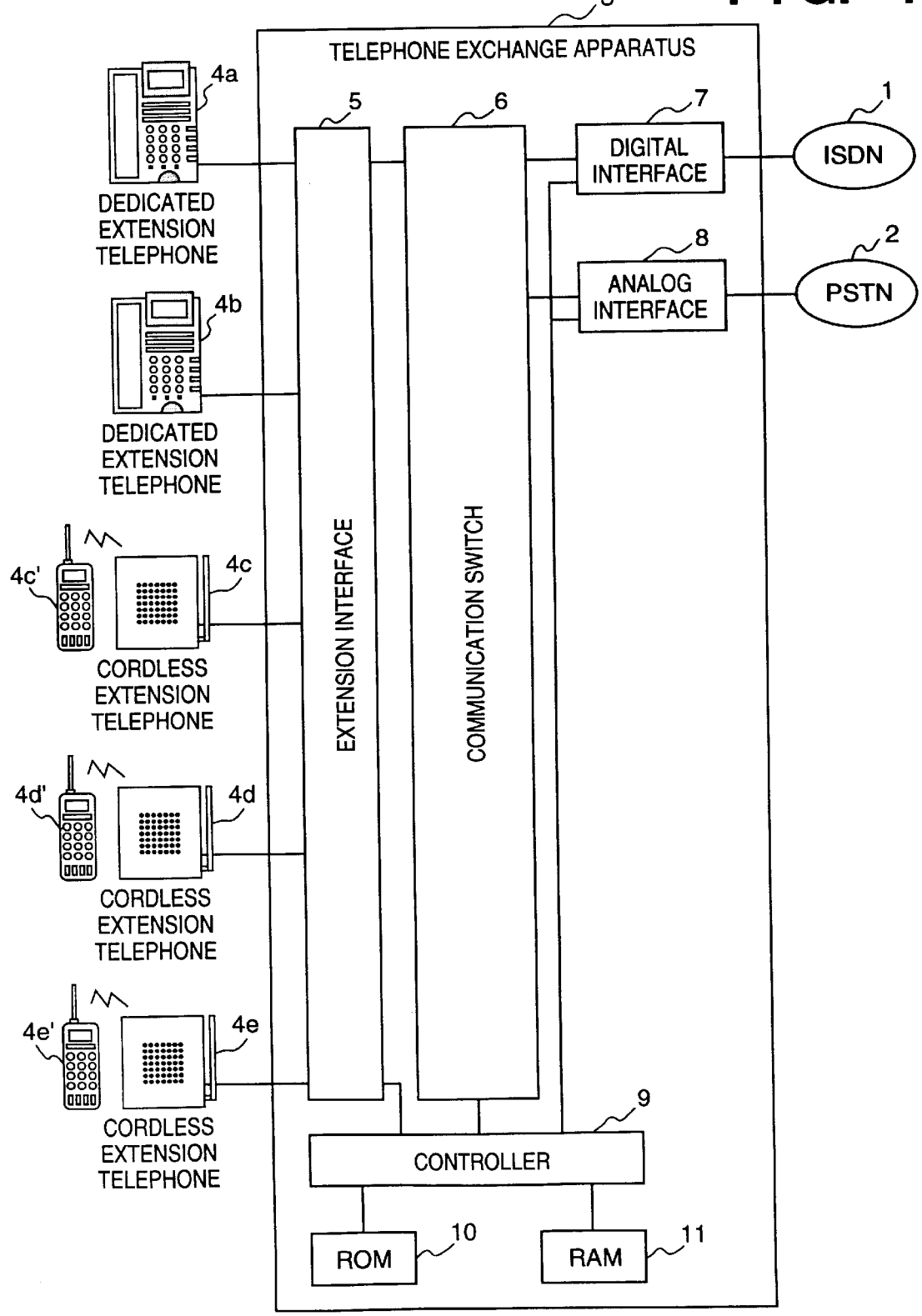
FIG. 1 is a block diagram showing the construction of a telephone exchange device according to an embodiment of the present invention.

FIG. 1 is a block diagram showing the construction of a telephone exchange apparatus containing cordless telephones to which the present invention is applied. In FIG. 1, a telephone exchange apparatus 3 is connected to an integrated services digital network (ISDN) 1 via a digital interface 7 and a public switched telephone network (PSTN) 2 such as an analog communication network via an analog interface 8. Also, the telephone exchange apparatus 3 accommodates dedicated extension telephones 4a and 4b, and extension cordless telephones consisting of main phones 4c, 4d and 4e and subphones 4c' 4d' and 4e', via an extension interface 5. A plural items of audio information from the respective interfaces are exchanged in a communication switch 6, under the control of a controller 9. Program for the controller 9 to perform control is stored in a ROM 10, and reading/writing of data necessary for the control is made by using a RAM 11.

Figure 2:
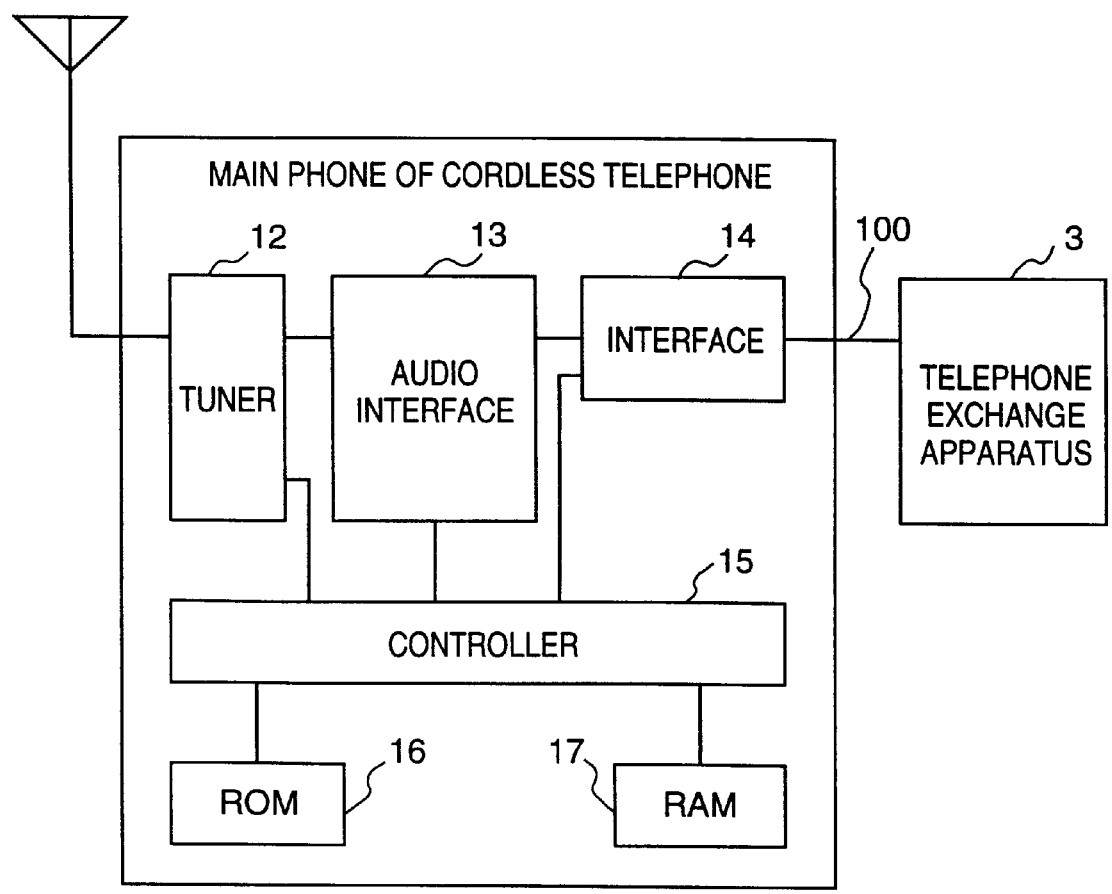
FIG. 2 is a block diagram showing the construction of a main phone of a cordless telephone apparatus.

FIG. 2 is a block diagram showing the construction of a main phone of the cordless telephone. The main phone is connected to the telephone exchange apparatus 3 via a line 100 and an interface 14. Audio information from the telephone exchange apparatus 3 is transferred to a tuner 12 via an audio interface 13. A controller 15 controls the respective circuits of the main phone and transmission of control signals to and from a subphone is done using the tuner 12. A program for the controller 15 to perform control of the main phone is stored in a ROM 16, and reading/writing of data necessary for the control is made by using a RAM 17. The tuner 12 also has a function of detecting wireless communication signals. The tuner 12 includes a MODEM (not shown).

Figure 3:
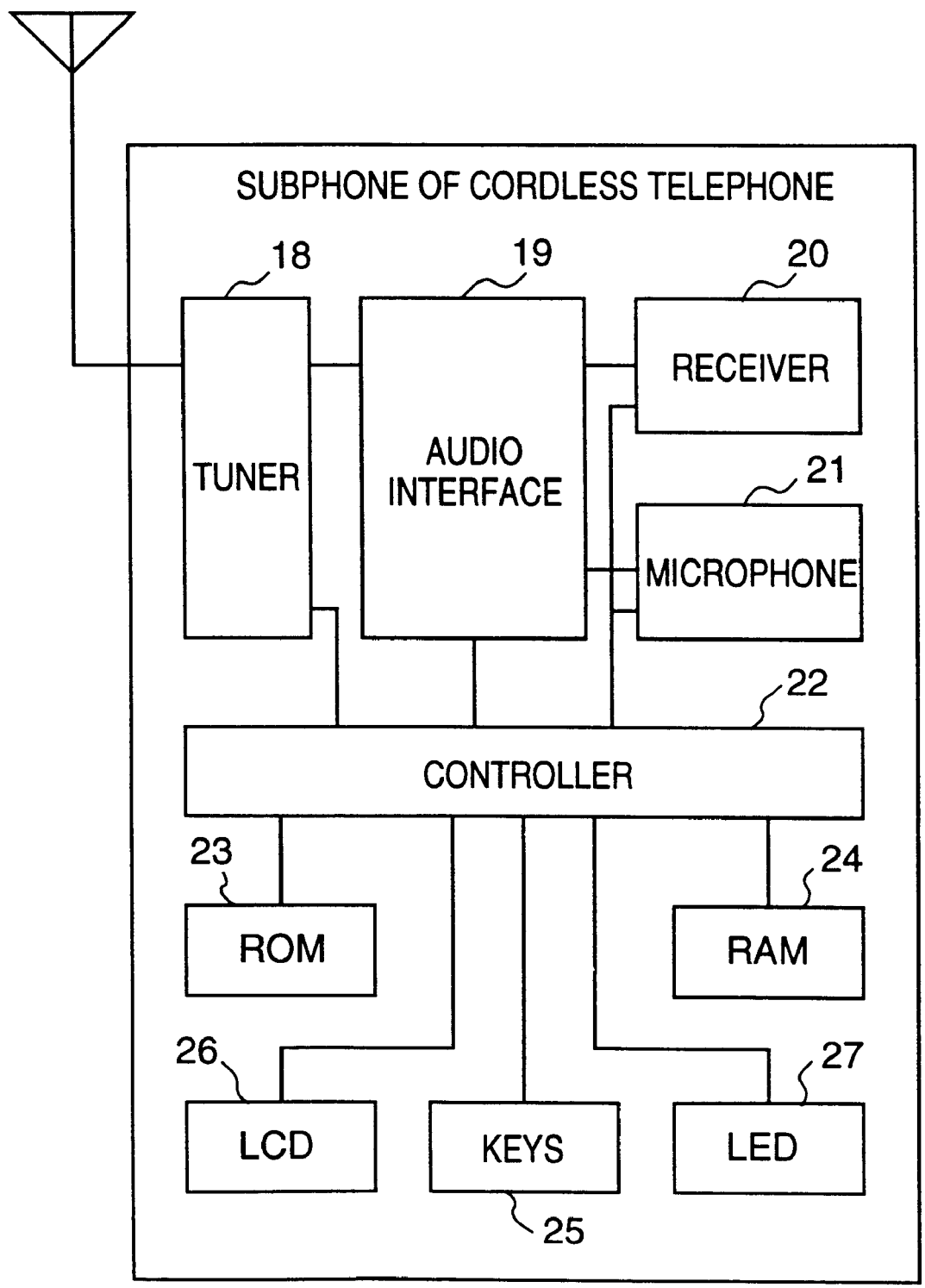
FIG. 3 is a block diagram showing the construction of a subphone of the cordless telephone apparatus.

FIG. 3 is a block diagram showing the construction of the subphone of the cordless telephone. The subphone performs wireless communication with the main phone via a tuner 18. Audio information from the main phone is received by a tuner 18 and passed through an audio interface 19, and sent to receiver 20 while audio information inputted from a microphone 21 is transmitted to the main phone through the audio interface 19 and the tuner 18.

A controller 22 controls audio processing, detection of key input from keys 25, display on an LCD 26 and indication on an LED 27, and also controls transmission of control signals using the tuner 18, to and from the main phone. A program for the controller 22 to perform control of the subphone is stored in a ROM 23, and reading/writing of data necessary for the control is made by using a RAM 24. The tuner 18 includes a MODEM (not shown).

Figure 4:
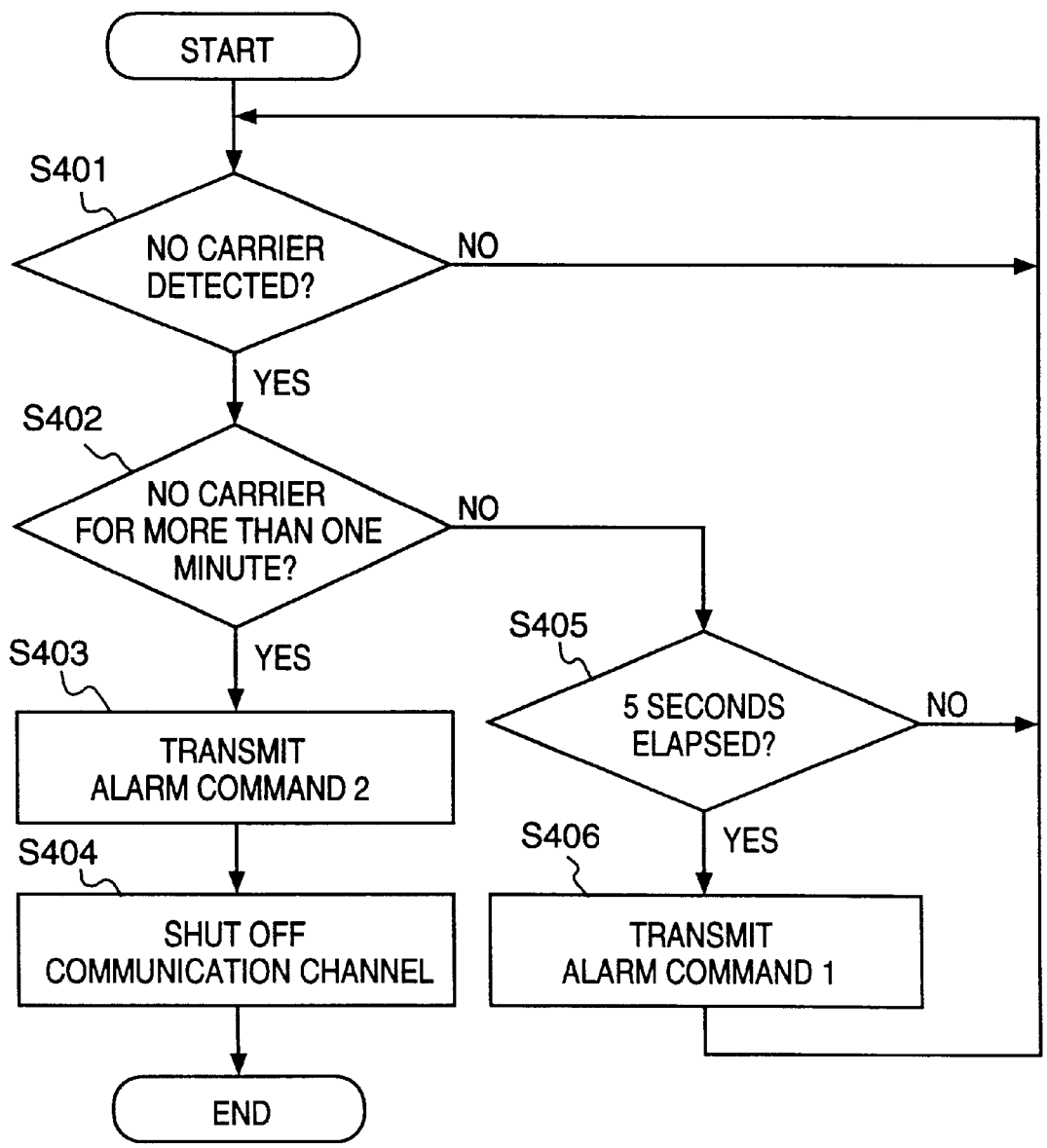
FIG. 4 is a flowchart showing the operation of a controller of the main phone of the cordless telephone apparatus.
Figure 5:
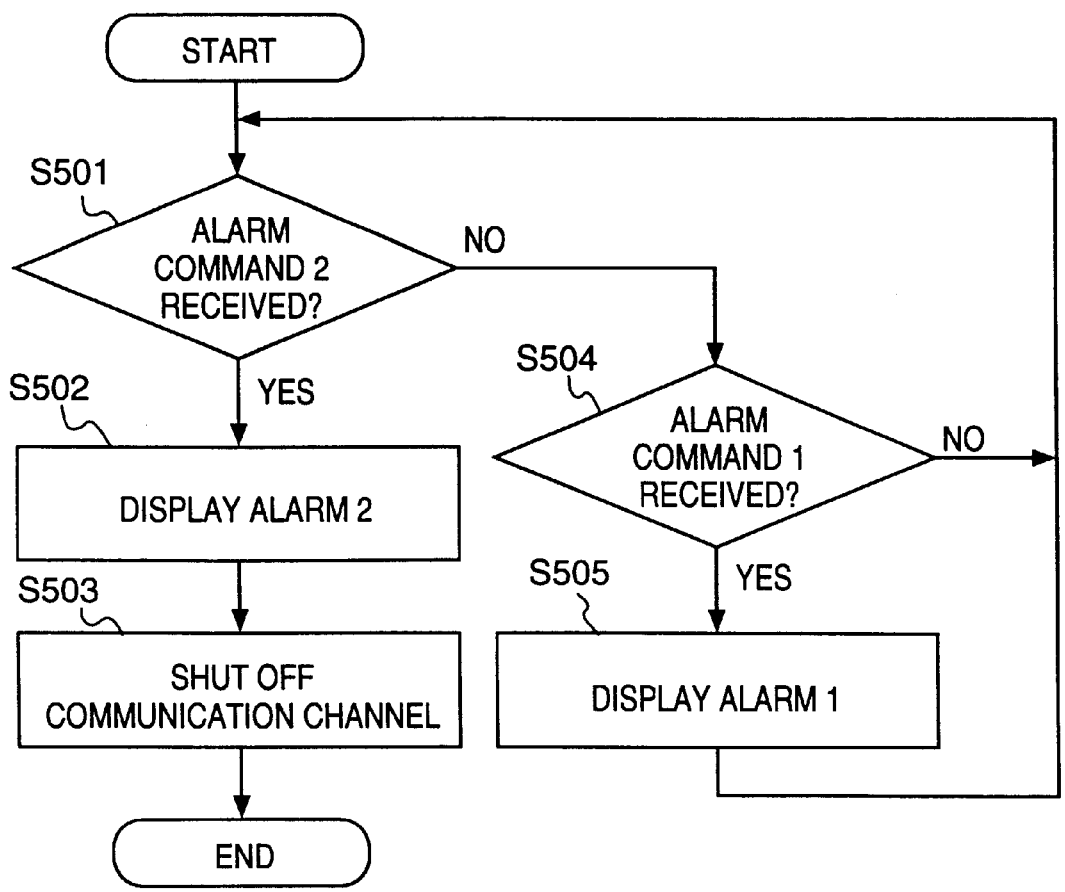
FIG. 5 is a flowchart showing the operation of a controller of the subphone of the cordless telephone apparatus.

FIG. 4 is a flowchart showing the operation of the controller 15 of the main phone. FIG. 5 is a flowchart showing the operation of the controller 22 of the subphone. The flowchart of FIG. 4 shows a carrier detection processing at the main phone when it is in communication. In communication with the subphone, the controller 15 of the main phone continually monitors carrier signals of the communication channel. In a case where a carrier signal from the subphone is not detected by the tuner 12 ("YES" at step S401) and a state where no carrier signal is detected continues for less than one minute ("NO" at step S402), the controller 15 activates the tuner 12 to transmit an "alarm command 1" to the subphone at five-second intervals (S405 and S406) so as to inform the absence of carrier. This alarm command 1 is transmitted by radio waves associated with the communication channel, and received by the subphone. If the controller 15 has not detected the carrier signal for more than one minute ("YES" at step S402), the tuner 12 is activated to transmit an "alarm command 2" to the subphone, so as to inform the subphone of shutting off the communication channel (S403). After that, the controller 15 shuts off the wireless communication channel, stops transmission of radio waves, and disconnect the communication between the line 100 and the telephone exchange apparatus 3.

FIG. 5 is a flowchart showing the processing executed by the subphone in response to the alarm commands which are transmitted from the main phone as shown in FIG. 4. When the controller 22 of the subphone receives an alarm command 1 from the main phone ("YES" at step S504), the controller 22 displays an "alarm 1" (S505) to be described later. When the controller 22 receives the alarm command 2 from the main phone ("YES" at step S501), the controller displays an "alarm 2" to be described later, and shuts off the communication channel (S503).

Figure 6:
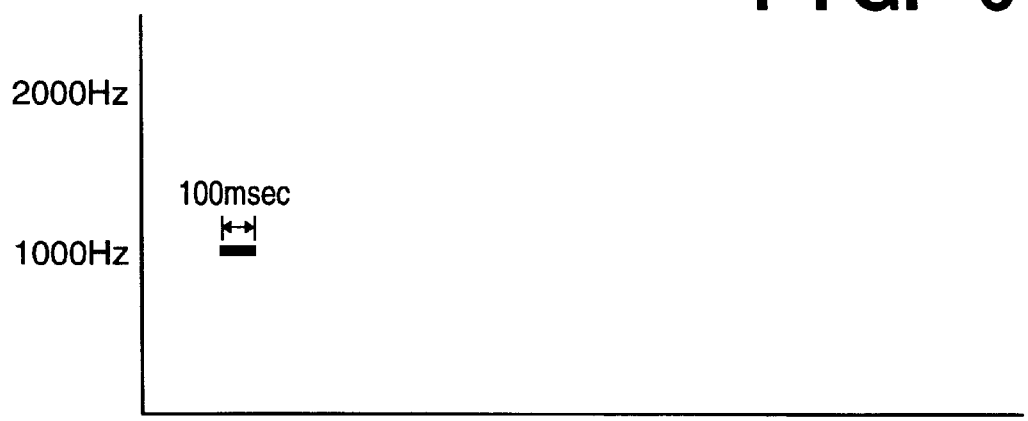
FIG. 6 is an example of an alarm sound 1 according to the embodiment.
Figure 7:
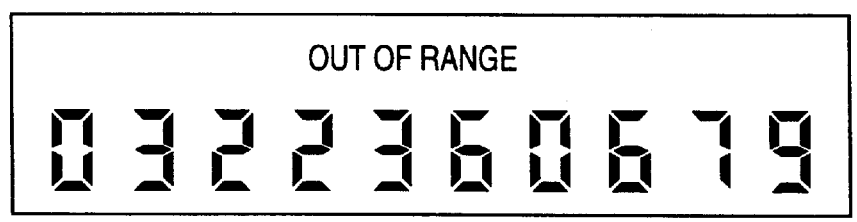
FIG. 7 is an example of an alarm display 1 according to the embodiment.
Figure 8:
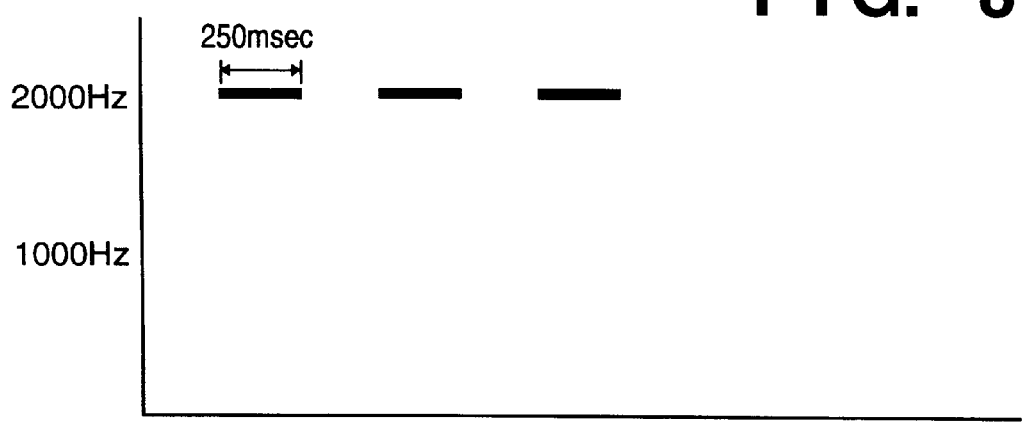
FIG. 8 is an example of an alarm sound 2 according to the embodiment.

FIGS. 6 to 8 show examples of alarm display at the subphone. The subphone emits an alarm 1 which sounds like "[pi]" (1000 Hz, 100 msec) from the audio interface 19 via the receiver 20, as shown in FIG. 6, while displaying a message "OUT OF RANGE" as shown in FIG. 7 on the LCD 26. Similarly, the subphone emits an alarm 2 which sounds like "[pi pi pi]" (2000 Hz, 250 msec) as shown in FIG. 8.

It should be noted that the transmission intervals of the alarm command 1 are not limited to five seconds, but an appropriate time period may be selected so long as it is shorter than one minute. It should also be noted that duration of the state where no carrier signal is detected is not limited to one minute.

Further, the audio interface 13 of the main phone and the audio interface 19 of the subphone may incorporate a signal transmission/reception circuit which treats a frequency outside of an audio frequency band (300 Hz to 3400 Hz) of, e.g., an ordinary telephone line, for modulating a signal of the alarm at the frequency out of that band and transmitting the command. Since the transmission of alarm command in this manner affects no influence in the audio frequency band, occurrence of noise due to the transmission of an alarm can be prevented, and only alarm sound can be heard from the subphone.

Further, the main phone itself may transmit the "alarm 1" sounds like "[pi]" (1000 Hz, 100 msec) and the "alarm 2", sounds like "[pi pi pi]" (2000 Hz, 250 msec) to the subphone.

The present invention is applicable to a wireless communication apparatus such as a cordless telephone, which can be directly connected to a public telephone line.

As described above, according to the present invention, when a carrier signal from the subphone has not been detected for a predetermined period, the main phone transmits an alarm command to the subphone, and stops transmission of a wireless signal to the subphone. By adopting this configuration, it is possible to avoid abrupt shut-off of radio waves from the main phone to the subphone.

Further, when a wireless signal has not been received for a predetermined period, the main phone transmits an alarm command and stops transmission of wireless signal to the subphone. This allows a user, for example, to charge a battery built-in the subphone, in accordance with the alarm command.

Furthermore, repetition of transmission of the alarm command, or change of display in accordance with the degree of alarm indicated by the alarm command makes notification of the alarm exactly.

In addition, as the main phone has the subphone stop transmission of wireless signal, quick termination of communication is possible.

Further, while in communication, by transmitting an alarm using a signal at a frequency outside of an audio frequency band (300 Hz to 3400 Hz), a certain noise which is audible in communication can be eliminated.

The present invention can be applied to a system constituted by a plurality of devices or to an apparatus comprising a single device.

As many apparently widely different embodiments of the present invention can be made without departing from the spirit and scope thereof, it is to be understood that the invention is not limited to the specific embodiments thereof except as defined in the appended claims.

What is claimed is:

1. A wireless communication apparatus having a first communication device and a second communication device for performing wireless communication, said second communication device comprising:

detection means for detecting a first wireless signal from said first communication device;

transmission means for transmitting a first alarm signal to said first communication device if the wireless signal is not detected by said detection means such that said first communication device makes a first alarm, and for transmitting a second alarm signal to said first communication device if the wireless signal is not detected by said detection means for a predetermined period such that said first communication device makes a second alarm which is different from the first alarm; and halt means for halting transmission of a second wireless signal to said first communication device, after transmission of the second alarm signal by said transmission means.

2. The wireless communication apparatus according to claim 1, wherein said transmission means repeatedly transmits the first alarm signal before the transmission of the second alarm signal.

3. The wireless communication apparatus according to claim 1, wherein said transmission means transmits the second alarm signal in a case where said halt means should halt the transmission of the second wireless signal.

4. The wireless communication apparatus according to claim 1, wherein the first alarm signal is a command to said first communication device to perform a predetermined display.

5. The wireless communication apparatus according to claim 4, wherein said first communication device, upon reception of the command for performing the predetermined display, performs a visible display, an audible indication or a display obtained by the combination of the visible display and the audible indication.

6. The wireless communication apparatus according to claim 1, wherein the first and second alarm signals are display commands instructing to perform display operations different from each other.

7. The wireless communication apparatus according to claim 1, wherein upon reception of the second alarm signal, said first communication device halts transmission of the first wireless signal to said second communication device.

8. The wireless communication apparatus according to claim 1, wherein said transmission means transmits the first and second alarm signals by utilizing a frequency outside of an audible frequency band.

9. The wireless communication apparatus according to claim 1, wherein said first communication device is a portable device, while said second communication device is a stationary device.

10. The wireless communication apparatus according to claim 1, wherein said second communication device comprises connection means for connecting a wireless communication circuit between said first and second communication devices to an external communication line accommodated by said wireless communication apparatus, and disconnection means for disconnecting the connection between the wireless communication circuit and the external communication circuit and the external communication line and terminates the wireless communication after said transmission means transmits the second alarm signal.

11. The wireless communication apparatus according to claim 1, wherein the first alarm signal includes a sound signal.

12. A communication control method comprising the steps of:

attempting to detect a first communication signal from a communication terminal;

transmitting a first alarm signal to the communication terminal if the first communication signal is not detected by said attempting step such that the communication terminal makes a first alarm;

transmitting a second alarm signal to the communication terminal if the first communication signal is not detected by said attempting step for a predetermined period such that the communication terminal makes a second alarm which is different from the first alarm; and halting transmission of a second communication signal to the communication terminal after transmission of the second alarm signal.

13. The communication control method according to claim 12, wherein the first alarm signal is repeatedly transmitted before the transmission of the second alarm signal.

14. The communication control method according to claim 12, wherein the second alarm signal is transmitted in a case where the transmission to the communication terminal should be halted.

15. The communication control method according to claim 12, wherein the first alarm signal is a command to the communication terminal to perform a predetermined display.

16. The communication control method according to claim 15, wherein the communication terminal, upon reception of the command for performing the predetermined display, performs a visible display, an audible indication or a display obtained by the combination of the visible display and the audible indication.

17. The communication control method according to claim 12, wherein the second alarm signal is transmitted for halting transmission of the signal by the communication terminal.

18. The communication control method according to claim 12, wherein the communication terminal halts the transmission of said first communication signal upon reception of the second alarm signal.

19. The communication control method according to claim 12, wherein the first and second alarm signals are transmitted by utilizing a frequency outside of an audio frequency band.

20. The communication control method according to claim 12, wherein the communication terminal is a portable device.

21. The communication control method according to claim 12, wherein connection is made between the communication terminal and an external communication line, and the connection is disconnected after the second alarm signal is transmitted.

22. The communication control method according to claim 12, wherein the first alarm signal includes a sound signal.

23. A communication control apparatus comprising:

detecting means for detecting a state of a first communication from a communication terminal;

transmitting means for transmitting a first alarm signal to the communication terminal in accordance with a state detection of said detecting means such that the communication terminal makes a first alarm, and a second alarm signal to the communication terminal in a case where the first alarm signal is transmitted a predetermined number of times such that the communication terminal makes a second alarm which is different from the first alarm; and halting means for halting a second communication to the communication terminal after transmission of the second alarm signal.

24. The communication control apparatus according to claim 23, wherein, if the state in which the first alarm signal should be transmitted continues for a predetermined period, said halting means halts the communication.

25. The communication control apparatus according to claim 23, wherein said transmitting means transmits the first alarm signal repeatedly before the transmission of the second alarm signal.

26. The communication control apparatus according to claim 23, wherein said transmitting means transmits the second alarm signal in a case where the communication should be halted.

27. The communication control apparatus according to claim 23, wherein the first alarm signal is a command to the communication terminal to perform a predetermined display.

28. The communication apparatus according to claim 27, wherein the communication terminal, upon reception of the command for performing the predetermined display, performs a visible display, an audible indication or a display obtained by the combination of the visible display and the audible indication.

29. The communication control apparatus according to claim 23, wherein the first and second alarm signals are display commands instructing to perform display operations different from each other.

30. The communication control apparatus according to claim 23, wherein the communication terminal halts the first communication upon reception of the second alarm signal.

31. The communication control apparatus according to claim 23, wherein the first and second alarm signals are transmitted by utilizing a frequency outside of an audio frequency band.

32. The communication control apparatus according to claim 23, wherein the state detected by said detecting means includes no carrier from the communication terminal.

33. The communication control apparatus according to claim 23, wherein the communication terminal is a portable device.

34. The communication control apparatus according to claim 23, further comprising connecting means for connecting the communication terminal and an external communication line, and for disconnecting the connection after the second alarm signal is transmitted.

35. The communication control apparatus according to claim 23, wherein the first alarm signal includes a sound signal.

36. A communication apparatus having a first communication device and a second communication device, wherein said second communication device comprises:

detecting means for detecting a state of connection between said first communication device and said second communication device; and transmitting means for transmitting a first alarm signal in accordance with a state detection of said detecting means such that said first communication device makes a first alarm, and for transmitting a second alarm signal which is different from the first alarm signal when the state in which the first alarm signal should be transmitted continues for a predetermined period such that said first communication device makes a second alarm, and said first communication device disconnects the connection between said first communication device and said second communication device after the second alarm is received.

37. The apparatus according to claim 36, wherein said transmitting means transmits the second alarm signal in a case where said detecting means detects the state for a predetermined period.

38. The apparatus according to claim 36, wherein said transmitting means repeatedly transmits the first alarm signal before the transmission of the second alarm signal.

39. The apparatus according to claim 36, wherein said second communication device disconnects the connection in response to the second alarm signal.

40. The apparatus according to claim 36, wherein said first communication device is a portable device, and said second communication device is a stationary device.

41. The apparatus according to claim 36, wherein said second communication device comprises connection means for connecting a wireless communication circuit between said first and second communication devices to an external communication line accommodated by said communication apparatus, and disconnection means for disconnecting the connection between the wireless communication circuit and the external communication line after said transmitting means transmits the second alarm signal.

42. The apparatus according to claim 36, wherein the state detected by said detecting means includes no carrier from said first communication device.

43. A communication control method comprising the steps of:

detecting a state of connection between communication devices;

transmitting a first alarm signal in accordance with a state detection in said detecting step such that the communication device makes a first alarm; and transmitting a second alarm signal which is different from the first alarm signal when the state in which the first alarm signal should be transmitted continues for a predetermined period such that the communication device makes a second alarm and disconnects the connection.

44. The method according to claim 43, wherein the first alram signal is repeatedly transmitted before the transmission of the second alarm signal.

45. The method according to claim 43, wherein the communication devices are a portable device and a stationary device.

46. The method according to claim 43, wherein connection between an external line and a wireless communication circuit with the communication devices is disconnected after the transmission of the second alarm signal.

47. The method according to claim 43, wherein the state detected in said detecting step includes no carrier from said first communication device.

48. A communication apparatus comprising:

detecting means for detecting a state of connection with a communication device; and transmitting means for transmitting a first alarm signal in accordance with a state detection of said detecting means such that the communication device makes a first alarm and for transmitting a second alarm signal which is different from the first alarm signal when the state in which the first alarm signal should be transmitted continues for a predetermined period such that the communication device makes a second alarm and disconnects the connection.

49. The apparatus according to claim 48, wherein said transmitting means transmits the second alarm signal in a case where said detecting means detects the trouble for a predetermined period.

50. The apparatus according to claim 48, wherein said transmitting means repeatedly transmits the first alarm signal before the transmission of the second alarm signal.

51. The apparatus according to claim 48, wherein said communication device is a portable device, and said second communication device is a stationary device.

52. The apparatus according to claim 48, further comprising:

connection means for connecting an external communication line and a wireless communication circuit with the communication device; and disconnection means for disconnecting the connection between the external communication line and the wireless communication circuit after said transmitting means transmits the second alarm signal.

53. The apparatus according to claim 48, wherein the state detected by said detecting means includes no carrier from said first communication device.

54. A communication control method comprising the steps of:

detecting a state of connection between communication devices;

transmitting a first alarm signal in accordance with a state detection in said detecting step such that the communication device makes a first alarm; and transmitting a second alarm signal which is different from the first alarm signal in a case where the first alarm signal is transmitted a predetermined number of times such that the communication device makes a second alarm before disconnecting the connection.

55. The method according to claim 54, wherein the second alarm signal is transmitted when the state in which the first alarm signal should be transmitted continues for a predetermined period.

56. The method according to claim 54, wherein the communication devices are a portable device and a stationary device.

57. The method according to claim 54, wherein connection between an external line and a wireless communication circuit with the communication devices is disconnected after the transmission of the second alarm signal.

58. The method according to claim 54, wherein the state detected in said detecting step includes no carrier from said first communication device.

59. The method according to claim 54, wherein the predetermined number of times is N, and the second alarm signal is transmitted when a predetermined time has passed since the Nth first alarm signal is transmitted.

60. A communication apparatus comprising:

detecting means for detecting a state of connection with a communication device;

transmitting means for transmitting a first alarm signal in accordance with a state detection of said detecting means such that the communication device makes a first alarm and for transmitting a second alarm signal which is different from the first alarm signal in a case where the first signal is transmitted a predetermined number of times such that the communication device makes a second alarm before disconnecting the connection.

61. The apparatus according to claim 60, wherein said transmitting means transmits the second alarm signal when the state in which the first alarm signal should be transmitted continues for a predetermined period.

62. The apparatus according to claim 60, wherein said communication device is a portable device, and said second communication device is a stationary device.

63. The apparatus according to claim 60, further comprising:

connection means for connecting an external communication line and a wireless communication circuit with the communication device; and disconnecting means for disconnecting the connection between the external communication line and the wireless communication circuit after said transmitting means transmits the second alarm signal.

64. The apparatus according to claim 60, wherein the state detected by said detecting means includes no carrier from said first communication device.

65. The apparatus according to claim 60, wherein the predetermined number of times is N times, and said transmitting means transmits the second alarm signal when a predetermined time has passed since the Nth first alarm signal is transmitted.

* * * * *

UNITED STATES PATENT AND TRADEMARK OFFICE
CERTIFICATE OF CORRECTION

PATENT NO.    : 5,999,809  
DATED         : December 7, 1999  
INVENTOR(S)   : Mitsuhiro Watanabe Page 1 of 1

It is certified that error appears in the above-identified patent and that said Letters Patent is hereby corrected as shown below:

<u>Title page</u>
Under [56] "Other Publications" insert:
-- S. Arai. U.S. Patent Application Serial No. 08/310,253, filed September 21, 1994 --.

Signed and Sealed this

Twenty-first Day of August, 2001

*Attest:*

*Attesting Officer*

NICHOLAS P. GODICI
*Acting Director of the United States Patent and Trademark Office*